United States Patent
Li et al.

(10) Patent No.: US 12,073,340 B1
(45) Date of Patent: Aug. 27, 2024

(54) ACCURATE INDIVIDUAL QUEUE LEVEL METRIC FORECASTING FOR VIRTUAL CONTACT CENTER QUEUES WITH INSUFFICIENT DATA, USING MODELS TRAINED AT HIGHER GRANULARITY LEVEL

(71) Applicant: Amazon Technologies, Inc., Seattle, WA (US)

(72) Inventors: Yiwei Li, Bellevue, WA (US); Wei Niu, Bellevue, WA (US); Tak Chung Lung, Bellevue, WA (US); Yung-Chun Lin, Seattle, WA (US); Thomas Boyd Johnston, Seattle, WA (US); Manjeshwar Donthi, Bellevue, WA (US); Richard Julian Rodriguez, Shoreline, WA (US); Jon Russell Jay, Mercer Island, WA (US); Pasquale DeMaio, Bellevue, WA (US); Phillip H Keung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 17/216,473

(22) Filed: Mar. 29, 2021

(51) Int. Cl.
*G06Q 10/04* (2023.01)
*G06N 20/00* (2019.01)
*G06Q 10/0631* (2023.01)

(52) U.S. Cl.
CPC ............. *G06Q 10/04* (2013.01); *G06N 20/00* (2019.01); *G06Q 10/06311* (2013.01); *G06Q 10/06315* (2013.01)

(58) Field of Classification Search
CPC ....... G06Q 10/06393; G06Q 10/06398; G06Q 10/067; G06Q 10/0639; G06Q 10/04;
(Continued)

(56) References Cited

U.S. PATENT DOCUMENTS

| | | | |
|---|---|---|---|
| 6,898,190 B2 * | 5/2005 | Shtivelman | H04M 3/5232 370/252 |
| 7,110,525 B1 * | 9/2006 | Heller | H04M 3/523 379/265.11 |

(Continued)

OTHER PUBLICATIONS

Chen, Yitian et al., Probabilistic forecasting with temporal convolutional neural network Neurocomputer, vol. 399, 2020 (Year: 2020).*

(Continued)

*Primary Examiner* — Scott L Jarrett
(74) *Attorney, Agent, or Firm* — Robert C. Kowert; Kowert, Hood, Munyon, Rankin & Goetzel, P.C.

(57) ABSTRACT

Methods, systems, and computer-readable media for accurate usage forecasting for virtual contact centers are disclosed. A contact center management system configures a contact center instance associated with a client. The contact center instance comprises a plurality of queues configured to store contacts. At least a portion of the contacts are routed to a plurality of agents. The contact center management system determines, using one or more machine learning models associated with the contact center instance, a plurality of predictions for a plurality of metrics for the contact center instance for a plurality of time horizons. At least a portion of the predictions are generated for individual queues of the contact center instance.

20 Claims, 9 Drawing Sheets

(58) Field of Classification Search
CPC .......... G06Q 10/06315; H04M 3/5175; H04M 2203/402; H04M 2203/556
See application file for complete search history.

(56) References Cited

U.S. PATENT DOCUMENTS

| | | | | |
|---|---|---|---|---|
| 7,409,054 | B2 | 8/2008 | Galvin | |
| 7,478,051 | B2* | 1/2009 | Nourbakhsh | G06Q 30/0202 705/7.14 |
| 7,653,726 | B2 | 1/2010 | Kaplan | |
| 7,734,498 | B2 | 6/2010 | Chen-Ritzo et al. | |
| 7,788,286 | B2* | 8/2010 | Nourbakhsh | H04M 3/5233 707/802 |
| 7,817,794 | B2 | 10/2010 | Galvin | |
| 8,015,042 | B2* | 9/2011 | Seetharaman | G06Q 10/06375 705/7.12 |
| 8,140,454 | B2 | 3/2012 | Bullen et al. | |
| 8,189,761 | B2* | 5/2012 | Shaffer | H04M 3/5232 379/266.03 |
| 8,364,519 | B1* | 1/2013 | Basu | G06Q 10/06393 705/7.38 |
| 8,396,732 | B1* | 3/2013 | Nies | G06Q 10/06 705/7.22 |
| 8,666,795 | B2 | 3/2014 | Cameron et al. | |
| 9,378,475 | B2* | 6/2016 | Gnanasambandam | G06Q 10/063112 |
| 10,129,404 | B2* | 11/2018 | Smith | H04M 3/5233 |
| 10,440,180 | B1* | 10/2019 | Jayapalan | G06N 20/00 |
| 10,715,665 | B1* | 7/2020 | Smith | G06N 20/00 |
| 10,771,628 | B1* | 9/2020 | Singh | H04M 3/5175 |
| 10,778,846 | B1* | 9/2020 | Petropoulos | G06Q 50/10 |
| 10,783,442 | B1 | 9/2020 | Torkkola et al. | |
| 10,812,658 | B1* | 10/2020 | Veloso | H04M 3/5232 |
| 11,087,261 | B1* | 8/2021 | Basu | G06Q 10/0639 |
| 11,368,588 | B1* | 6/2022 | Johnston | H04M 3/5238 |
| 11,475,327 | B2* | 10/2022 | Moody, III | G06N 5/04 |
| 2001/0000458 | A1* | 4/2001 | Shtivelman | H04M 3/5232 370/412 |
| 2002/0052770 | A1* | 5/2002 | Podrazhansky | G06Q 10/06315 705/7.18 |
| 2003/0002653 | A1* | 1/2003 | Uckun | H04M 3/51 379/266.06 |
| 2003/0009520 | A1* | 1/2003 | Nourbakhsh | H04M 3/5233 709/204 |
| 2003/0108187 | A1* | 6/2003 | Brown | H04M 3/523 379/266.03 |
| 2005/0256760 | A1* | 11/2005 | Siddhanti | G06Q 10/06315 705/7.25 |
| 2006/0282301 | A1* | 12/2006 | Olson | G06Q 10/06 705/7.38 |
| 2008/0172275 | A1* | 7/2008 | Ramanujan | G06Q 10/06312 705/7.22 |
| 2008/0172286 | A1* | 7/2008 | Ramanujan | G06Q 10/06 705/7.31 |
| 2011/0158398 | A1* | 6/2011 | Kannan | H04M 3/5191 379/265.09 |
| 2011/0235798 | A1* | 9/2011 | Ibrahim | H04M 3/5238 379/265.14 |
| 2012/0224680 | A1* | 9/2012 | Spottiswoode | H04M 3/5232 379/265.11 |
| 2015/0286982 | A1* | 10/2015 | Dwyer | G06Q 10/067 705/7.17 |
| 2016/0088153 | A1* | 3/2016 | Wicaksono | H04M 3/523 379/265.06 |
| 2016/0155080 | A1* | 6/2016 | Gnanasambandam | G06Q 10/063112 379/265.03 |
| 2019/0340115 | A1* | 11/2019 | Kulkarni | H04L 43/50 |
| 2020/0014801 | A1* | 1/2020 | Mohiuddin | G06Q 10/06393 |
| 2020/0082319 | A1* | 3/2020 | Gouw | G06Q 10/06393 |
| 2020/0293922 | A1* | 9/2020 | Moody, III | G06N 20/00 |
| 2021/0174288 | A1* | 6/2021 | Gvildys | H04M 3/323 |
| 2021/0201244 | A1* | 7/2021 | Sella | G06Q 10/04 |
| 2021/0271925 | A1* | 9/2021 | Yocum | G06K 9/6289 |
| 2021/0326129 | A1* | 10/2021 | Cook | G06F 9/44526 |
| 2022/0027837 | A1* | 1/2022 | D'Attilio | H04M 3/5175 |
| 2022/0156667 | A1* | 5/2022 | Bellenguez | G06Q 10/06375 |
| 2022/0166884 | A1* | 5/2022 | Bohannon | G06Q 10/06375 |

OTHER PUBLICATIONS

Ahmend, Abdelrahman et al., Agent Productivity Modeling in Call Center Domain Using Attentive Convolutional Neural Networks Sensors, vol. 20, 2020 (Year: 2020).*

Keon, Yunhwan et al., Call Center Count Prediction Model by Machine Learning Journal of JAITC, vol. 8, No. 1, Jul. 31, 2018 (Year: 2018).*

Baldon, Nicolo, Time series Forecast of Call volume in Call Centre using Statistical and Machine Learning Methods KTH Royal institute of Technology, 2019 (Year: 2019).*

Choi, Changkyu, Time Series Forecasting with Recurrent Neural Networks in Presence of Missing Data The Artic University of Norway, Nov. 2018 (Year: 2018).*

Jala, Mona Ebadi et al., Forecasting incoming call volumes in call centers in recurrent Neural Neworks Journal of Business Research, May 2016 (Year: 2016).*

Ibrahim, Rouba et al., Forecasting Call Center Arrivals: a comparative study University of Montreal, May 2012 (Year: 2012).*

Guo, Gongde et al., Data Reduction and Noise Filtering for Predicting Time Series Advances in Web-Age Information Management, WAIM 2002 (Year: 2002).*

Call Center Metrics NAQC Issue Paper, 2010 (Year: 2010).*

Jala, Mona Ebadi et al., Forecasting incoming call volumes in call centers with recurrent Neural Networks Journal of Business Research, vol. 69, 2016 (Year: 2016).*

Cleveland, Brad et al., Call Center Metrics: Key Performance Indicators (KPIs) ICMI Inc., Incoming.com, 2002 (Year: 2002).*

Danilo Poccia, "Amazon Forecast—Time Series Forecasting Made Easy", AWS News Blog, Nov. 2018, Retrieved from https://aws.amazon.com/blogs/aws/amazon-forecast-time-series-forecasting-made-easy/, pp. 1-6.

"NICE inContact CXone Spring 2019 Release Adds End-to-End Artificial Intelligence (AI) Capabilities", NICEinContact.com, Apr. 2019, Retrieved from https://www.niceincontact.com/call-center-software-company/press-releases/nice-incontact-cxone-spring-2019-release-adds-end-to-end-artificial intelligence-ai-capabilities, pp. 1-4.

Prabhat Pathak, "How to Create an ARIMA Model for Time Series Forecasting in Python," www.analyticsvidhya.com, Oct. 2020, Retrieved from https://www.analyticsvidhya.com/blog/2020/10/how-to-create-an-arima-model-for-time-series-forecasting-in-python/, pp. 1-20.

"Verint AI and Experience Management Cloud Recognized for Market Leadership in Omdia Report," verint.com, Sep. 2020, Retrieved from https://www.verint.com/press-room/2020-press-releases/verint-ai-and-experience-management-cloud-recognized-for-market-leadership-in-omdia-report/, pp. 1-4.

* cited by examiner

ACCURATE INDIVIDUAL QUEUE LEVEL METRIC FORECASTING FOR VIRTUAL CONTACT CENTER QUEUES WITH INSUFFICIENT DATA, USING MODELS TRAINED AT HIGHER GRANULARITY LEVEL

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. As the scale and scope of distributed systems have increased, the tasks of provisioning, administering, and managing system resources have become increasingly complicated. For example, the costs to manage distributed resources can increase with the complexity and scale of the resources.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for accurate usage forecasting for virtual contact centers are described. Contact centers are an increasingly common way for businesses to provide customer service to their customers. A virtual contact center or contact center instance may represent a logical construct, often hosted in a cloud computing environment, that permits a particular business to perform customer service tasks. For example, a virtual contact center may be associated with one or more customer-facing phone numbers or other access points (e.g., e-mail addresses, websites, and so on) at which customers can initiate contact with representatives (e.g., human agents, virtual agents, chatbots, and so on) of a particular business. A virtual contact center may include multiple queues for incoming contacts, with different queues being accessible by different agents and potentially having different purposes. For example, one set of agents may respond to contacts in a queue for placing orders, while another set of agents may respond to contacts in a queue for questions about past orders. A virtual contact center may implement one or more Interactive Voice Response (IVR) trees that can route contacts to the correct queue or agent based (at least in part) on customer input to various automated prompts. If an insufficient number of agents are available to process incoming contacts, then customer satisfaction may suffer. On the other hand, if an excessive number of agents are on the job (e.g., such that agents are idle too often), then the business may be paying an excessive amount in labor costs.

The aforementioned challenges, among others, are addressed by embodiments of the techniques described herein, whereby automated techniques may be used to make accurate forecasts about contact center usage. For example, a contact center management system may use machine learning models to predict demand metrics such as contact volume and average handling times for particular virtual contact centers. Using such forecasts, clients may properly staff their facilities with an appropriate number of agents to handle an anticipated set of incoming contacts without queues becoming too long or too many agents being idle. The contact center management system may make point forecasts and probabilistic forecasts (e.g., quantile forecasts). For particular metrics, the contact center management system may use one or more forecasting models to generate forecasts for different time horizons such as intraday, short-term, and long-term. The contact center management system may automatically retrain forecasting models regularly by taking the most recent history (e.g., according to recent metrics) into the training loop. In contrast to traditional time-series forecasting techniques that fit a model and make forecasts at the queue level, the contact center management system may train models at the level of a virtual contact center (a contact center instance) or a cluster of queues, e.g., a logical construct including multiple queues from the same client. However, the contact center management system may forecast at the queue level or queue-channel level.

The forecasting model(s) used by the contact center management system may learn queue patterns from multiple queues such that the model(s) are generalizable for new queue patterns. The forecasting model(s) may be trained rapidly. The model(s) may generate updated forecasts through model inference without requiring queue identifiers or a large amount of historical data for training. The forecasting model(s) may employ causal and dilated convolutional layers to extract high-level temporal patterns from multi-dimensional time series. The forecasting model(s) may include pooling, flattening, and fully-connected neural network layers to create forecasts efficiently and effectively. The forecasting model(s) may include a customized post-processing layer to perform further smoothing and reduce noise in demand and supply forecasts.

As one skilled in the art will appreciate in light of this disclosure, embodiments may be capable of achieving certain technical advantages, including some or all of the following: (1) reducing the use of computing resources (e.g., storage and memory) used to implement queues of incoming contacts to a virtual contact center by performing accurate usage forecasting and thus permitting clients to arrange for an appropriate number of agents to process the incoming contacts before queues become too long; (2) improving the speed of predicting contact center metrics by using temporal convolutional neural networks; (3) improving the quality of predicted contact center metrics by using a post-processing layer to reduce noise; (4) improving the quality of predicted contact center metrics by using business driver data to train client-specific machine learning models; (5) reducing the amount of historical queue data required from clients by using transfer learning techniques to train or customize client-specific machine learning models based on generic machine learning models; and so on.

Figure 1:
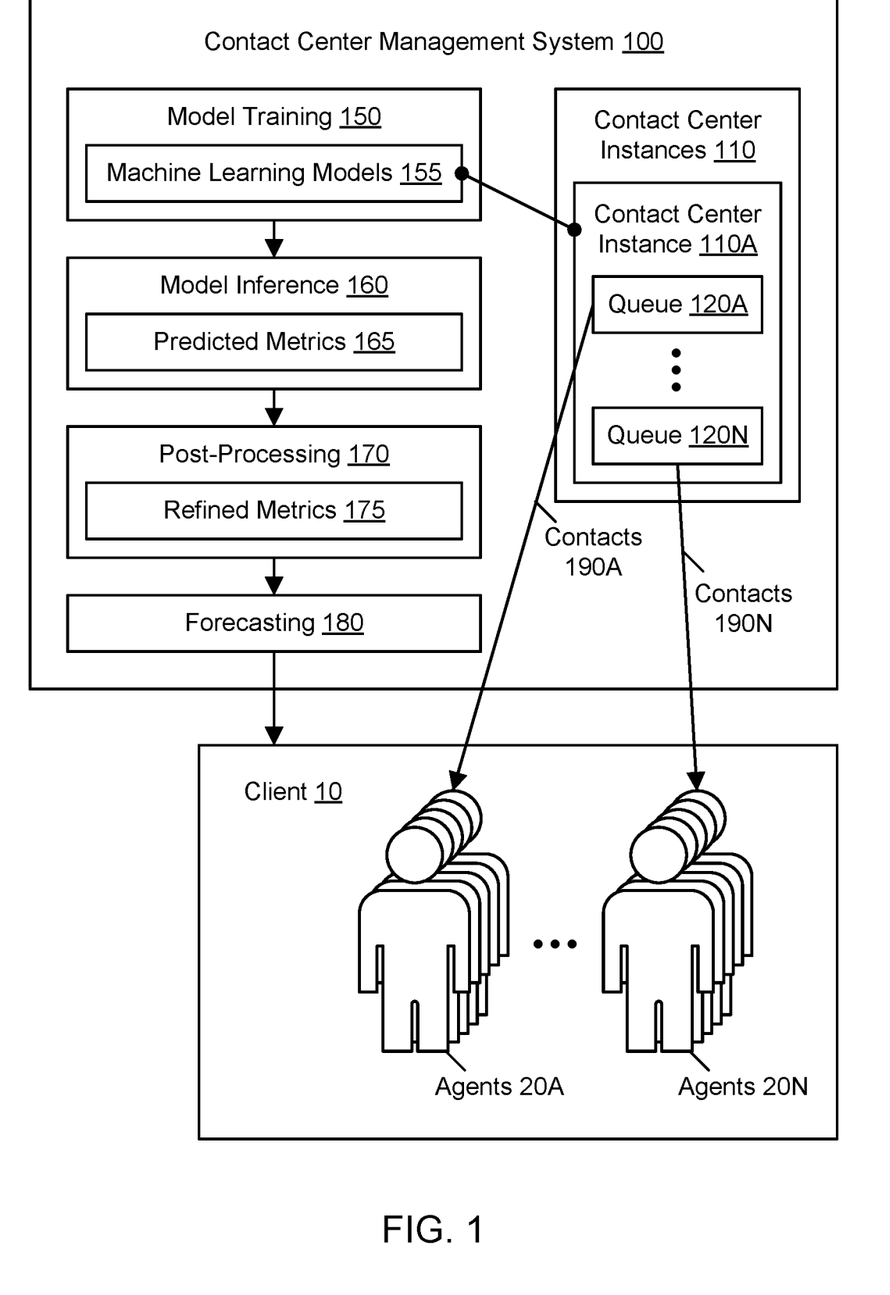
FIG. 1 illustrates an example system environment for accurate usage forecasting for virtual contact centers, according to some embodiments.

FIG. 1 illustrates an example system environment for accurate usage forecasting for virtual contact centers, according to some embodiments. A contact center management system 100 may provision, configure, and otherwise manage a variety of contact center instances 110. The contact center instances 110 may represent virtual contact centers that permit clients to perform customer service tasks. A particular instance, such as contact center instance 110A, may be provisioned (e.g., by reserving computing resources to implement the instance), configured (e.g., by establishing a set of queues 120A-120N and mapping those queues to agents 20A-20N), and managed (e.g., by using the queues to route incoming contacts to the agents) on behalf of a particular client 10. The client 10 may represent a business or other organization that seeks to provide their customers with human contact points in the form of the agents 20A-20N.

The contact center instance 110A may be configured with one or more customer-facing phone numbers or other access points (e.g., e-mail addresses, accounts on messaging systems or social media systems, and so on) at which customers can initiate contact with representatives (e.g., human agents 20A-20N, virtual agents, chatbots, and so on) of the client 10. The contact center instance 110A may be configured with multiple queues 120A-120N for incoming contacts 190A-190N, with different queues being accessible by different agents and potentially having different purposes. For example, one set of agents 20A may respond to contacts 190A in a queue 120A for placing orders, while another set of agents 20N may respond to contacts 190N in a queue 120N for questions about past orders. The contact center instance 110A may be configured with one or more Interactive Voice Response (IVR) trees that can route contacts to the correct queue or agent based (at least in part) on customer input to various automated prompts. A particular queue, such as queue 120A, may be associated with various channels such as text-based messaging and person-to-person voice contact. In some embodiments, contacts 190A-190N may include outgoing contacts, e.g., follow-up contacts from the agents 20A-20N to customers of the client 10.

The contact center management system 100 may include various components configured to implement model training 150, model inference 160, post-processing 170, and demand and supply forecasting 180. The model training 150 may train machine learning models 155 to predict metrics usable for demand and supply forecasting 180 for the particular contact center instance 110A associated with the particular client 10. The model training 150 may train other machine learning models to predict metrics usable for demand and supply forecasting 180 for other contact center instances associated with other clients. In some embodiments, the models 155 may be trained at the level of a contact center instance 110A or a cluster of queues (e.g., a set of queues having similar characteristics). However, using model inference 160, the contact center management system 100 may generate predicted contact center metrics 165 at the queue level or queue-channel level using models 155 trained at a higher level of granularity. The model training 150 may automatically retrain models 155 on a regular basis by using the most recent history (e.g., the most recent metrics) into the training loop.

In some embodiments, the contact center management system 100 may use one or more of the machine learning models 155 to predict metrics 165 such as contact volume for a queue or queue-channel. In some embodiments, the contact center management system 100 may use one or more of the machine learning models 155 to predict metrics 165 such as average handling time for a queue or queue-channel. In some embodiments, the contact center management system 100 may use one or more of the machine learning models 155 to predict metrics 165 such as customer satisfaction rates for a queue or queue-channel. In general, the contact center management system 100 may use one or more of the machine learning models 155 to predict a variety of metrics that clients may find useful in determining appropriate staffing levels at their contact centers in the future. In some embodiments, the contact center management system 100 may use one or more of the machine learning models 155 to predict a variety of metrics that clients may find useful in determining appropriate amounts of computing resources, networking resources, and/or power resources to be deployed at their contact centers in the future.

The machine learning models 155 may include temporal convolutional neural network models. In some embodiments, the machine learning models 155 used by the contact center management system 100 may learn queue patterns from multiple queues such that the models are generalizable for new queue patterns or queues without available historical data. In some embodiments, the machine learning models 155 may be trained and re-trained rapidly. In some embodiments, the machine learning models 155 may generate updated metrics 165 through model inference 160 without requiring queue identifiers or a large amount of historical data for specific queues. In some embodiments, the machine learning models 155 may employ causal and dilated convolutional layers to extract high-level temporal patterns from multi-dimensional time series. The dilated causal convolution may be used to extract features from continuous time series for time horizons of differing durations. In some embodiments, the machine learning models 155 may include pooling, flattening, and fully-connected neural network layers to create forecasts efficiently and effectively.

In some embodiments, the system 100 may include a post-processing layer 170 that performs additional tasks after model inference 160 such as smoothing, noise reduction, scaling, client-specified overrides, and other customizations in demand and supply forecasts. For example, as shown in FIG. 1, the noise reduction layer 170 may generate refined metrics 175 in which noise has been removed from the metrics 165. Noise reduction by the post-processing layer 170 may find and reduce specific noise patterns. For example, if the noise reduction identifies zeroes or very small values, the post-processing may perform smoothing by replacing such values using average values derived from the nearest neighboring values. In some embodiments, the system 100 may include a pre-processing layer that performs additional tasks prior to model training 150. For example, the pre-processing layer may create synthesized data for model training, perform backfills of missing data elements, and so on.

Based (at least in part) on predicted metrics 165 or 175 for the particular client 10, the demand and supply forecasting 180 may generate up-to-date usage forecasts for particular queues or queue-channels of the contact center instance 110A. The usage forecasts may represent predictions about usage of contact centers, their resources, and their employees. In various embodiments, forecasts may include demand forecasts and/or supply forecasts. Demand forecasting may reflect usage metrics driven by customers (contacts) of the contact centers, where such forecasts may be used to determine appropriate numbers of agents 20A-20N to handle the anticipated demand. Supply forecasting may represent usage metrics driven by agents 20A-20N, e.g., to predict how many agents will be available to work at future points in time. Using the metrics 165 or 175, the demand and supply forecasting 180 may make point forecasts and probabilistic forecasts (e.g., quantile forecasts). As will be discussed in greater detail below, demand and supply forecasts may be issued at different time horizons (e.g., intraday, short-term, long-term) and may be updated regularly.

The demand and supply forecasts may be provided to the client 10 via appropriate channels, e.g., in a management console for the contact center instance 110A or via an API. In some embodiments, forecasts or the underlying predictions may be provided to a downstream system that performs additional tasks prior to any forecast-related information being provided to the client 10. For example, using the forecasts or the underlying predictions, a downstream system may perform anomaly detection, capacity planning, scheduling, and so on. As another example, a downstream system may perform historical analysis, enrichment of forecasts with additional data, additional formatting, and so on. Using the output of the forecasting 180 or any downstream systems, the client 10 may properly staff their facilities with an appropriate number of agents 20A-20N to handle an anticipated set of incoming contacts 190A-190N without queues 120A-120N becoming too long or too many agents being idle. Thus the demand and supply forecasting 180 may permit the client 10 to optimize their use of agents 20A-20N to strike a balance between customer satisfaction and cost.

In one embodiment, one or more components of the contact center management system 100, such as contact center instances 110 and queues 120A-120N, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide the functionality and resources of the system 100. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the system 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. The provider network may be hosted in the cloud and may be termed a cloud provider network. In one embodiment, portions of the functionality of the provider network, such as aspects of the system 100, may be offered to clients in exchange for fees.

Figure 7:
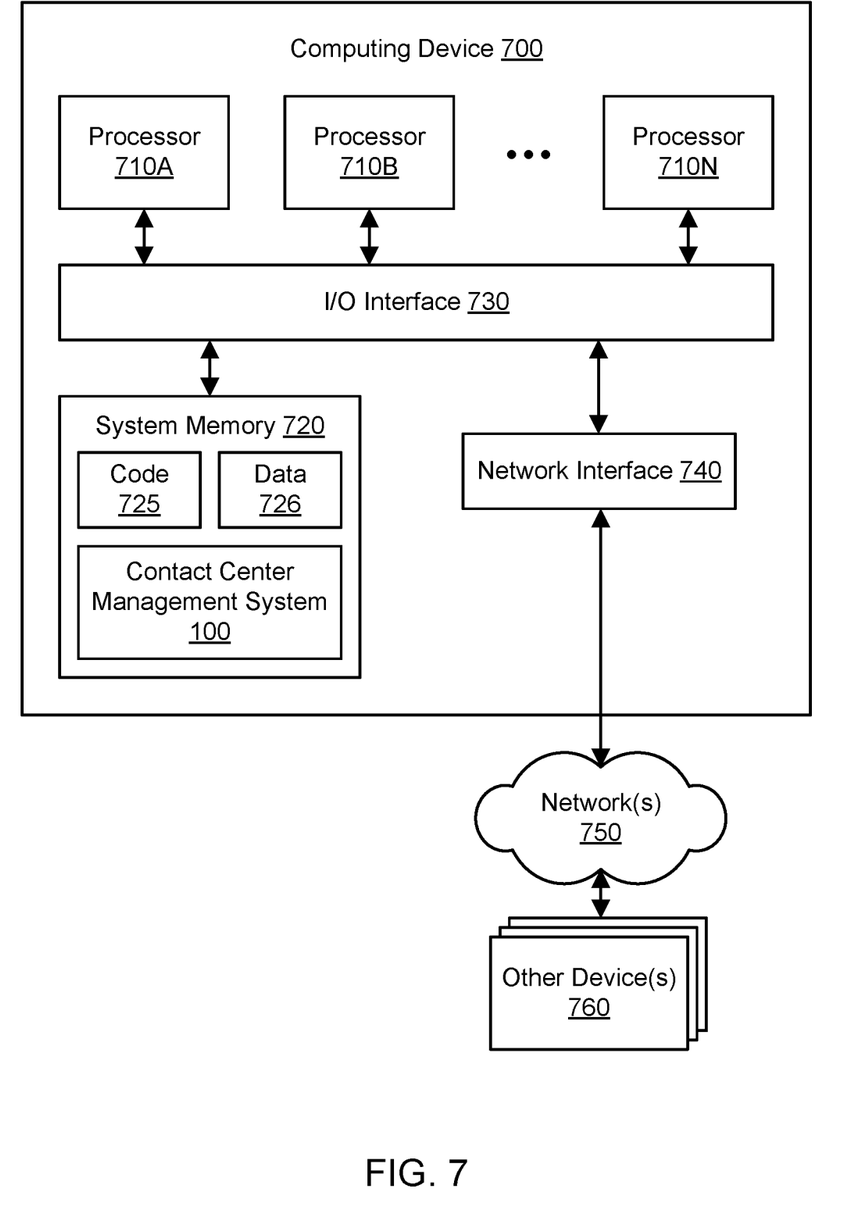
FIG. 7 illustrates an example computing device that may be used in some embodiments.

In various embodiments, components of the contact center management system 100 may be implemented using any suitable number and configuration of computing devices, any of which may be implemented by the example computing device 700 illustrated in FIG. 7. In some embodiments, the computing devices may be located in any suitable number of data centers or geographical locations. In various embodiments, at least some of the functionality of the system 100 may be provided by the same computing device or by different computing devices. In various embodiments, if any of the components of the system 100 are implemented using different computing devices, then the components and their respective computing devices may be communicatively coupled, e.g., via one or more networks. Any of the components of the system 100 may represent any combination of software and hardware usable to perform their respective functions. In some embodiments, operations implemented by the system 100 may be performed automatically, e.g., without a need for user initiation or user intervention after an initial configuration stage, and/or programmatically, e.g., by execution of program instructions on at least one computing device. In some embodiments, the system 100 may include additional components not shown, fewer components than shown, or different combinations, configurations, or quantities of the components shown.

Clients of the contact center management system 100 may represent external devices, systems, or entities with respect to the system. A user interface usable by a human agent to process contacts may run on such a device or may be implemented (at least in part) within the system 100 itself. Client devices may be managed or owned by one or more customers of the system 100, such as business entities that seek to use the system to feed incoming contacts to virtual agents or human agents 20A-20N. In one embodiment, the client devices may be implemented using any suitable number and configuration of computing devices, any of which may be implemented by the example computing device 700 illustrated in FIG. 7. A client 10 may convey network-based service requests to the system 100 via one or more networks, e.g., to receive contacts 190A-190N from queues 120A-120N. The network(s) may encompass any suitable combination of networking hardware and protocols necessary to establish network-based communications between client devices and the system 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the system 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the system 100. In one embodiment, client devices may communicate with the system 100 using a private network rather than the public Internet. In various embodiments, the various components of the system 100 may also communicate with other components of the system using one or more network interconnects.

Figure 2:
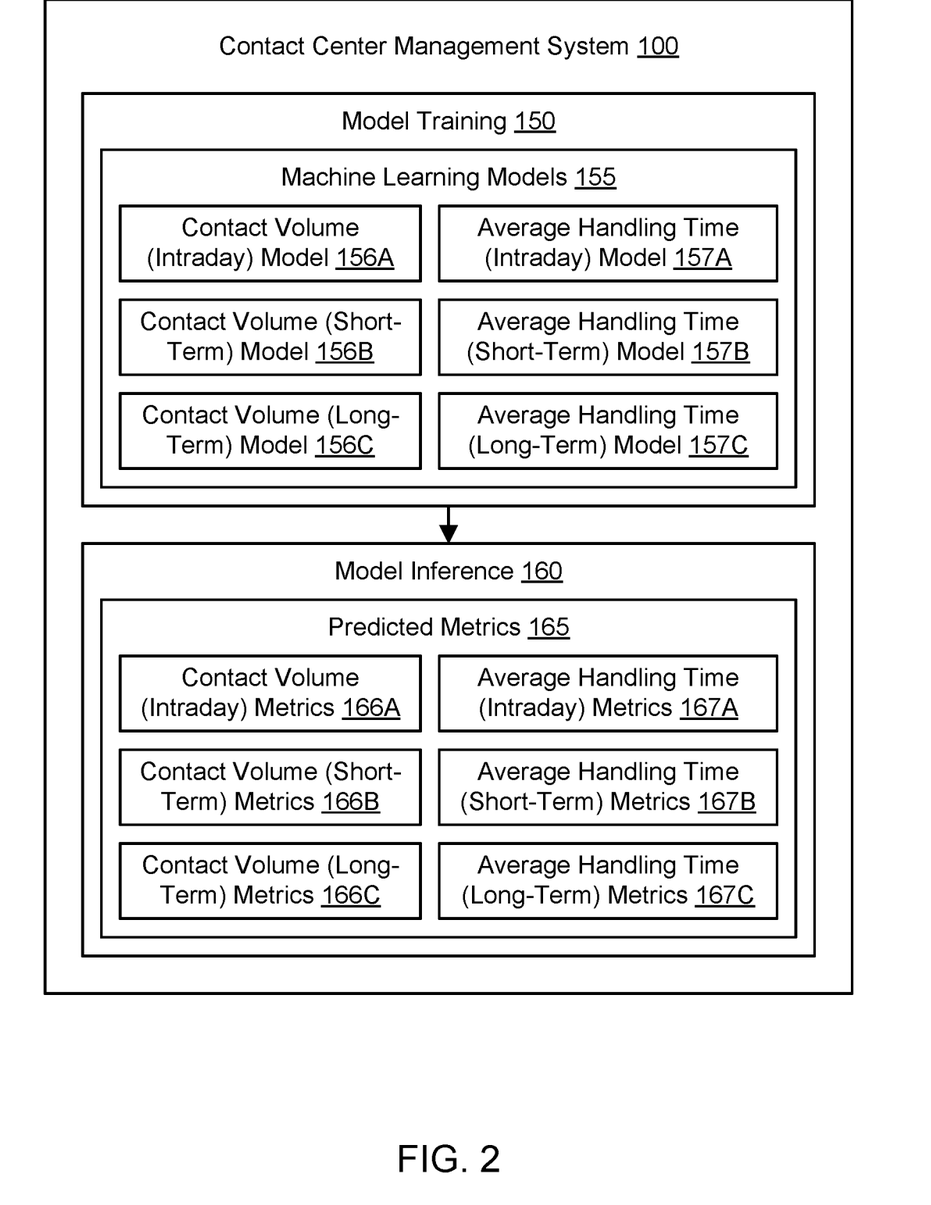
FIG. 2 illustrates further aspects of the example system environment for accurate usage forecasting for virtual contact centers, including examples of machine learning models and their output that are specific to particular metrics and particular time horizons, according to some embodiments.

FIG. 2 illustrates further aspects of the example system environment for accurate usage forecasting for virtual contact centers, including examples of machine learning models and their output that are specific to particular metrics and particular time horizons, according to some embodiments. As discussed above, metrics 165 and corresponding demand and supply forecasts may be generated at different time horizons. Time horizons may also be referred to as time windows. A time horizon may represent the period of time in which a predicted metric is applicable. For example, a particular metric may be predicted for an intraday time horizon (e.g., the next twenty-four hours or less), a short-term time horizon (e.g., the next thirteen weeks), and a long-term time horizon (e.g., the next twelve months). Different time horizons may be associated with particular intervals such as 15 to 30 minutes for the intraday time horizon, 15 to 30 minutes for the short-term time horizon, and one day for the long-term time horizon. Metrics 165 and corresponding demand and supply forecasts may be updated regularly, e.g., to reflect changes in the models or predicted changes in metrics over time. For example, new intraday metrics may be generated every fifteen minutes, new short-term metrics may be generated every week, and new long-term metrics may be generated every month. Changes in metrics over time may be determined using a sliding time window over time-series data. Predicted metrics may thus be generated at a higher frequency than the corresponding time horizons of the metrics such that successive predictions for the same metric and same time horizon may at least partially overlap in time. Machine learning models 155 may be retrained automatically and on a regular basis. For example, intraday models may be retrained daily using the last six months of training data (if available), short-term models may be retrained weekly using the last year of training data (if available), and long-term models may be retrained monthly using the last three years of training data (if available). In some embodiments, machine learning models may be trained using an amount of historical data that does not exceed the duration of the corresponding time horizon. For example, a long-term model may be trained using no more than one year of data.

In some embodiments, particular ones of the machine learning models 155 may be specific to particular metrics and particular time horizons. For example, the model training 150 may train a machine learning model 156A for the contact volume metric over an intraday time horizon, a machine learning model 156B for the contact volume metric over a short-term time horizon, a machine learning model 156C for the contact volume metric over a long-term time horizon, a machine learning model 157A for the average handling time metric over an intraday time horizon, a machine learning model 157B for the average handling time metric over a short-term time horizon, and a machine learning model 157C for the average handling time metric over a long-term time horizon. Similarly, the model inference may generate predicted metrics 165 using the more specific models 156A-156C and 157A-157C. For example, the model inference may generate contact volume metrics 166A over an intraday time horizon using the machine learning model 156A, contact volume metrics 166B over a short-term time horizon using the machine learning model 156B, contact volume metrics 166C over a long-term time horizon using the machine learning model 156C, average handling time metrics 167A over an intraday time horizon using the machine learning model 157A, average handling time metrics 167B over a short-term time horizon using the machine learning model 157B, and average handling time metrics 167C over a long-term time horizon using the machine learning model 157C.

In some embodiments, machine learning models 155 for the same metric but different time horizons may be used to perform tasks such as anomaly detection. For example, an intraday forecast may represent predictions about a particular metric for the next twenty-four hours. A short-term forecast for the same metric may represent predictions for several weeks or months. By comparing the intraday forecast to the short-term forecast, an anomaly detection process may identify any spikes in the metric and may notify the client 10 of the spikes. For example, if a spike in demand is identified for a period of time beginning three hours from now, the system 100 may send a notification to the client 10 so that additional agents can be added to handle the increased demand.

Figure 3A:
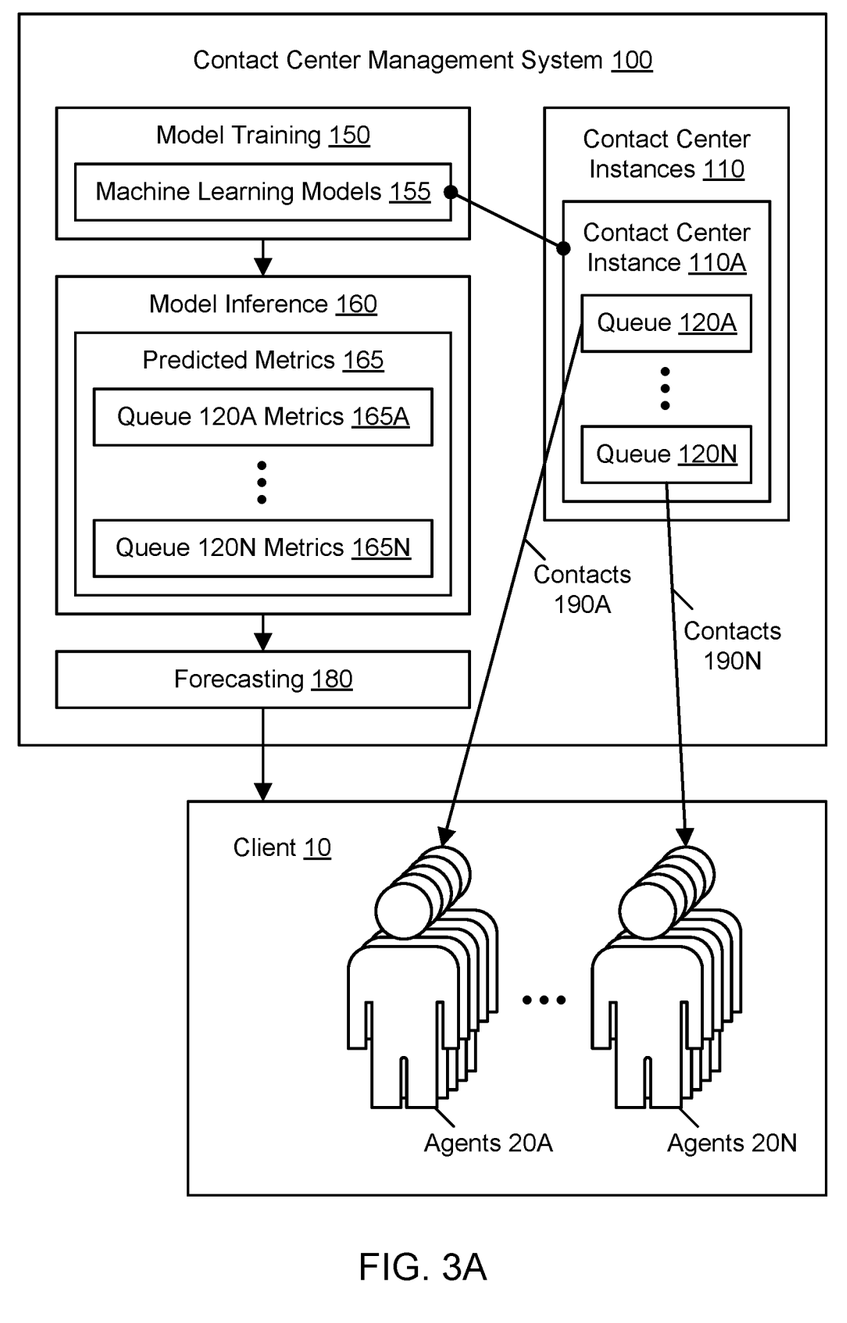
FIG. 3A illustrates further aspects of the example system environment for accurate usage forecasting for virtual contact centers, including queue-specific metrics generated using an instance-specific machine learning model, according to some embodiments.

FIG. 3A illustrates further aspects of the example system environment for accurate usage forecasting for virtual contact centers, including queue-specific metrics generated using an instance-specific machine learning model, according to some embodiments. As discussed above, the machine learning models 155 may be trained at the level of a contact center instance 110A or a cluster of queues having similar characteristics. In some embodiments, using model inference 160, the contact center management system 100 may generate predicted contact center metrics 165 at the queue level using the models 155 trained at the higher level of granularity. As shown in FIG. 3A, a set of machine learning models 155 may be trained for the entire contact center instance 110A, e.g., using data from multiple queues. Those models 155 may be used to generate queue-specific predicted metrics such as metrics 165A for queue 120A and metrics 165N for queue 120N.

Figure 3B:
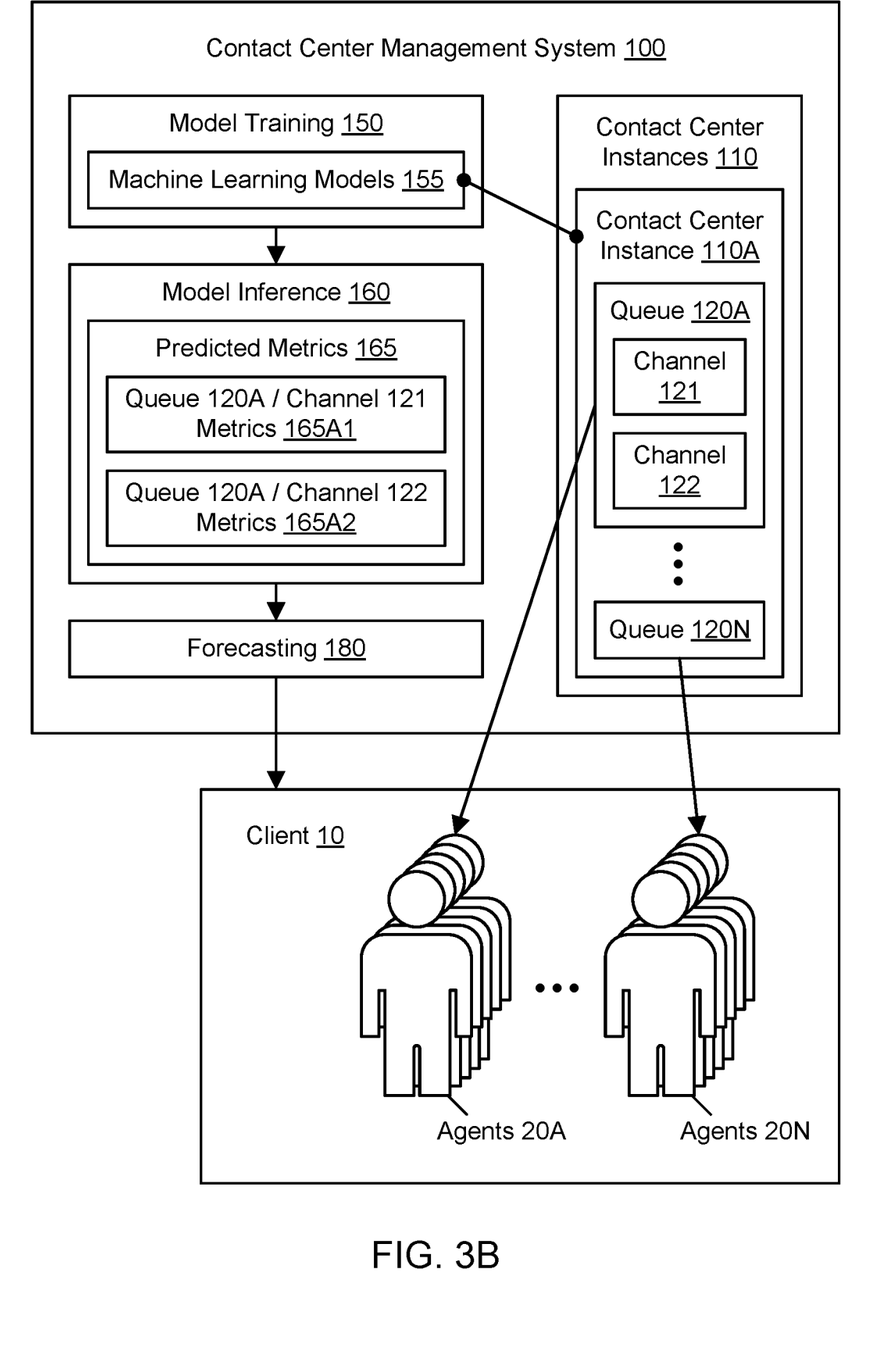
FIG. 3B illustrates further aspects of the example system environment for accurate usage forecasting for virtual contact centers, including queue-channel-specific metrics generated using an instance-specific machine learning model, according to some embodiments.

FIG. 3B illustrates further aspects of the example system environment for accurate usage forecasting for virtual contact centers, including queue-specific metrics generated using an instance-specific machine learning model, according to some embodiments. As discussed above, the machine learning models 155 may be trained at the level of a contact center instance 110A or a cluster of queues having similar characteristics. In some embodiments, using model inference 160, the contact center management system 100 may generate predicted contact center metrics 165 at the queue-channel level using the models 155 trained at the higher level of granularity. A particular queue, such as queue 120A, may be associated with various channels such as text-based messaging channel 121 and person-to-person voice contact channel 122. As shown in FIG. 3A, a set of machine learning models 155 may be trained for the entire contact center instance 110A, e.g., using data from multiple queues. Those models 155 may be used to generate queue-specific and channel-specific predicted metrics such as metrics 165A1 for channel 121 of queue 120A and metrics 165A2 for channel 122 of queue 120A.

Figure 4:
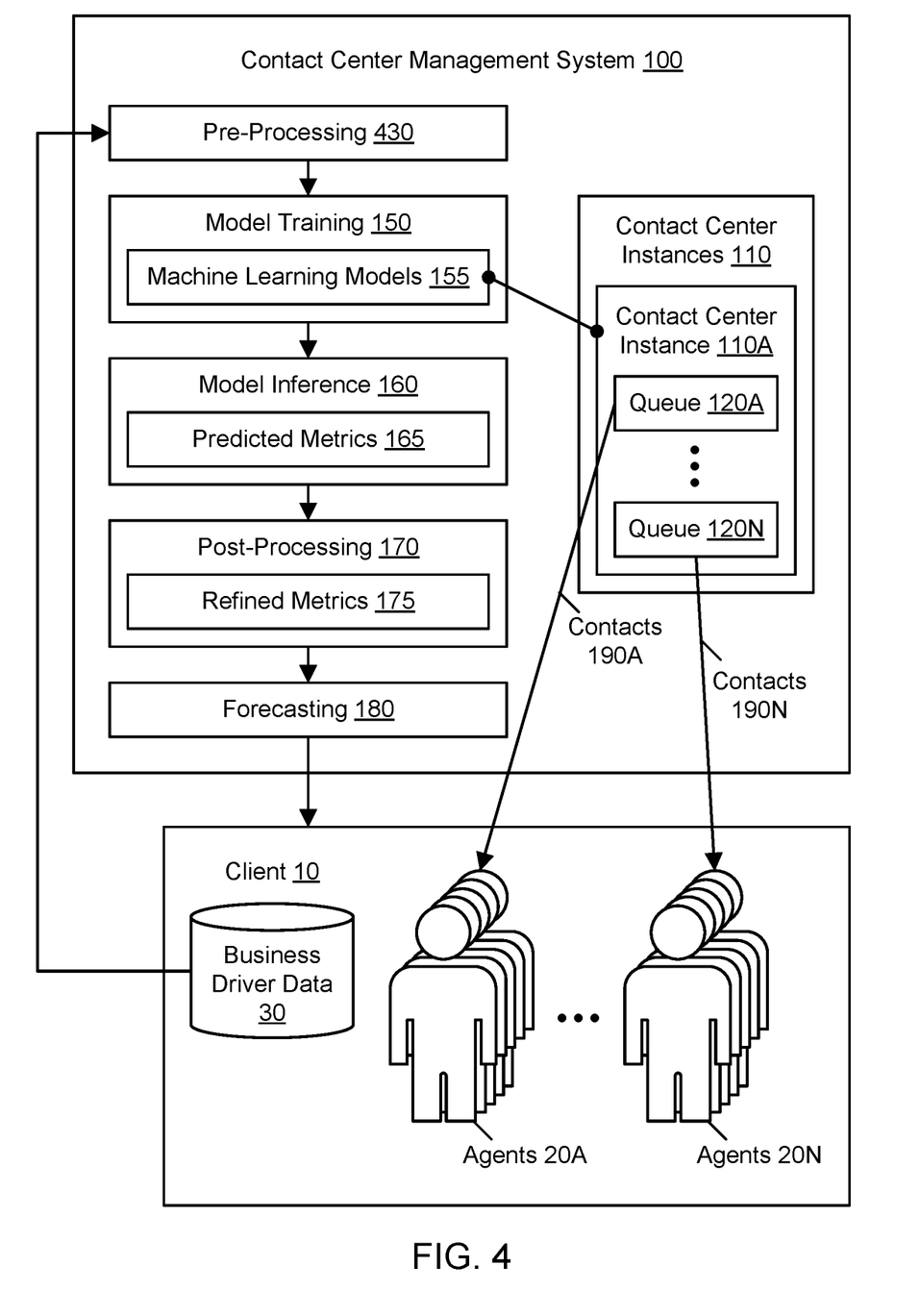
FIG. 4 illustrates further aspects of the example system environment for accurate usage forecasting for virtual contact centers, including model training based (at least in part) on business driver data, according to some embodiments.

FIG. 4 illustrates further aspects of the example system environment for accurate usage forecasting for virtual contact centers, including model training based (at least in part) on business driver data, according to some embodiments. Model training 150 may be performed based (at least in part) on business driver data 30. The business driver data 30 may be provided by the client 10. The business driver data 30 may include data that is correlated with or otherwise predictive of the metrics 165. For example, a total sales volume or other sales metric may be correlated with the contact volume of queues. The business driver data 30 may represent past data as well as forecasts of business driver metrics in the future. By permitting a client 10 to submit business driver data 30 instead of extensive historical metrics for queues 120A-120N, the system 100 may facilitate onboarding of clients who lack sufficient history for their queues. By permitting a client 10 to submit business driver data 30, the system 100 may also improve the accuracy of the predicted metrics 165. In some embodiments, business driver data 30 that degrades the accuracy of metrics 165 may be rejected.

In some embodiments, the system 100 may include a pre-processing layer 430 for business driver data 30 that performs additional tasks prior to model training 150. For example, the pre-processing layer 430 may perform validation of elements of the business driver data 30. Elements of the data that cannot be validated may be rejected. As another example, the pre-processing layer 430 may format elements of the business driver data 30 for use with model training 150, e.g., such that the input data meets a schema. As yet another example, the pre-processing layer 430 may clean the business driver data 30 prior to model training 150, e.g., such that irrelevant or erroneous elements are removed or modified to enable training of more accurate model(s) 155.

Figure 5:
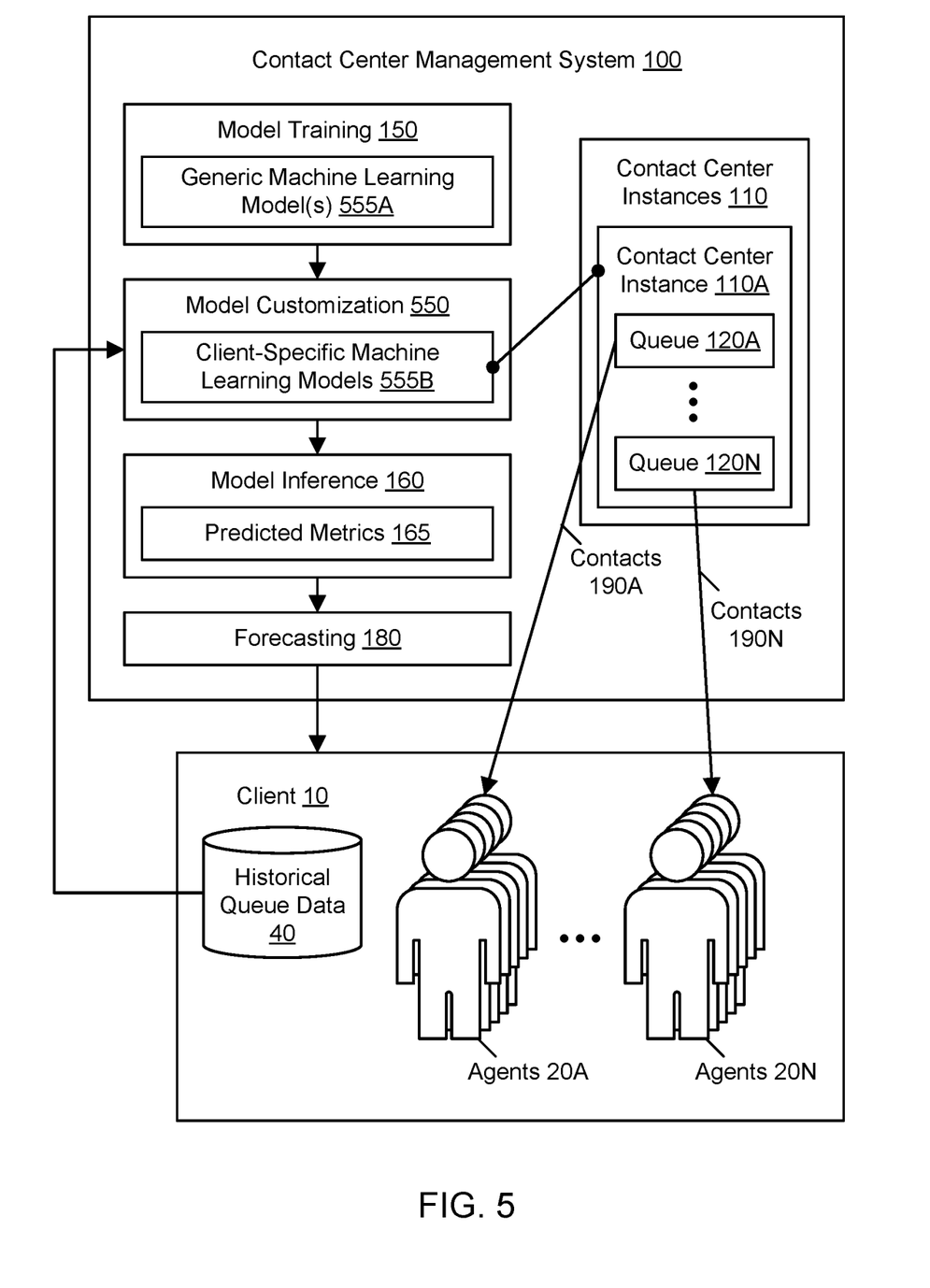
FIG. 5 illustrates further aspects of the example system environment for accurate usage forecasting for virtual contact centers, including customization of a generic machine learning model for specific clients according to client queue data, according to some embodiments.

FIG. 5 illustrates further aspects of the example system environment for accurate usage forecasting for virtual contact centers, including customization of a generic machine learning model for specific clients according to client queue data, according to some embodiments. The contact center management system 100 may use transfer learning techniques to train or customize client-specific machine learning models 555B based on one or more generic machine learning models 555A. The generic model(s) 555A may be trained using common patterns for contact center queues. In some embodiments, the generic model(s) 555A may be trained using historical queue data from contact centers other than that of the client 10. The system 100 may perform model customization 550 to adapt one or more of the generic model(s) 555A into client-specific machine learning models 555B. In some embodiments, the customization 550 may be performed using historical queue data 40 provided by the client 10 or otherwise collected on behalf of the client. The historical queue data 40 may describe the past behavior of queues, e.g., according to metrics such as contact volume and average handling time. However, using customization 550 of the generic model(s) 555A, the client 10 may submit less of the historical queue data 40 than would otherwise be necessary to train the client-specific models 555B.

By permitting a client 10 to submit only a limited amount of historical queue data 40 instead of extensive historical metrics for queues 120A-120N, the system 100 may facilitate "cold start" onboarding of clients who lack sufficient history for their queues. In some embodiments, the system 100 may perform queue-agnostic inference in order to provide forecasts in a cold start scenario. In some embodiments, the system 100 may generate synthetic data based on a limited amount of historical data to enable model training. In some embodiments, the system 100 may perform transfer learning to bootstrap from a generic model and fine-tune in a customer-specific way.

Figure 6A:
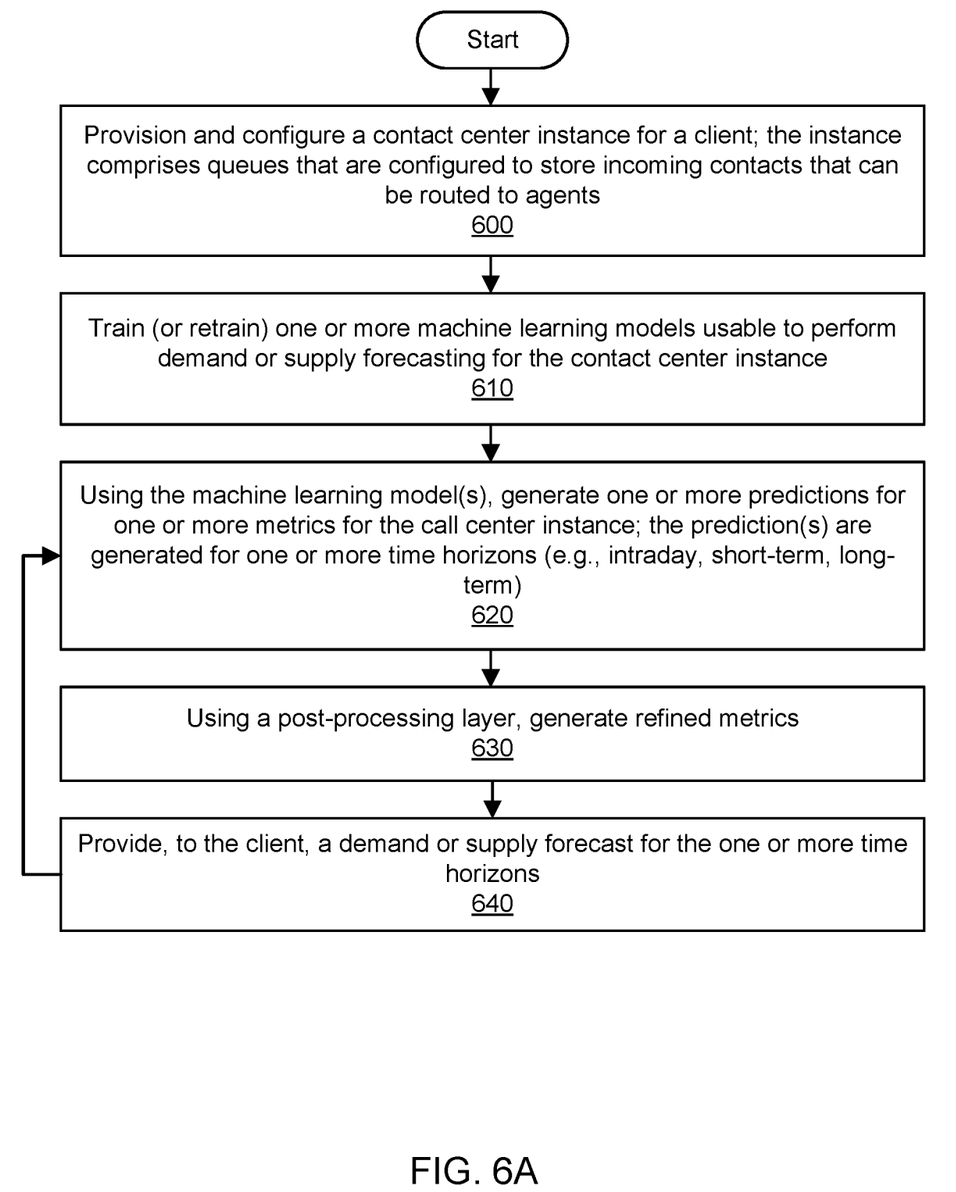
FIG. 6A and FIG. 6B are flowcharts illustrating methods for accurate usage forecasting for virtual contact centers, according to some embodiments.
Figure 6B:
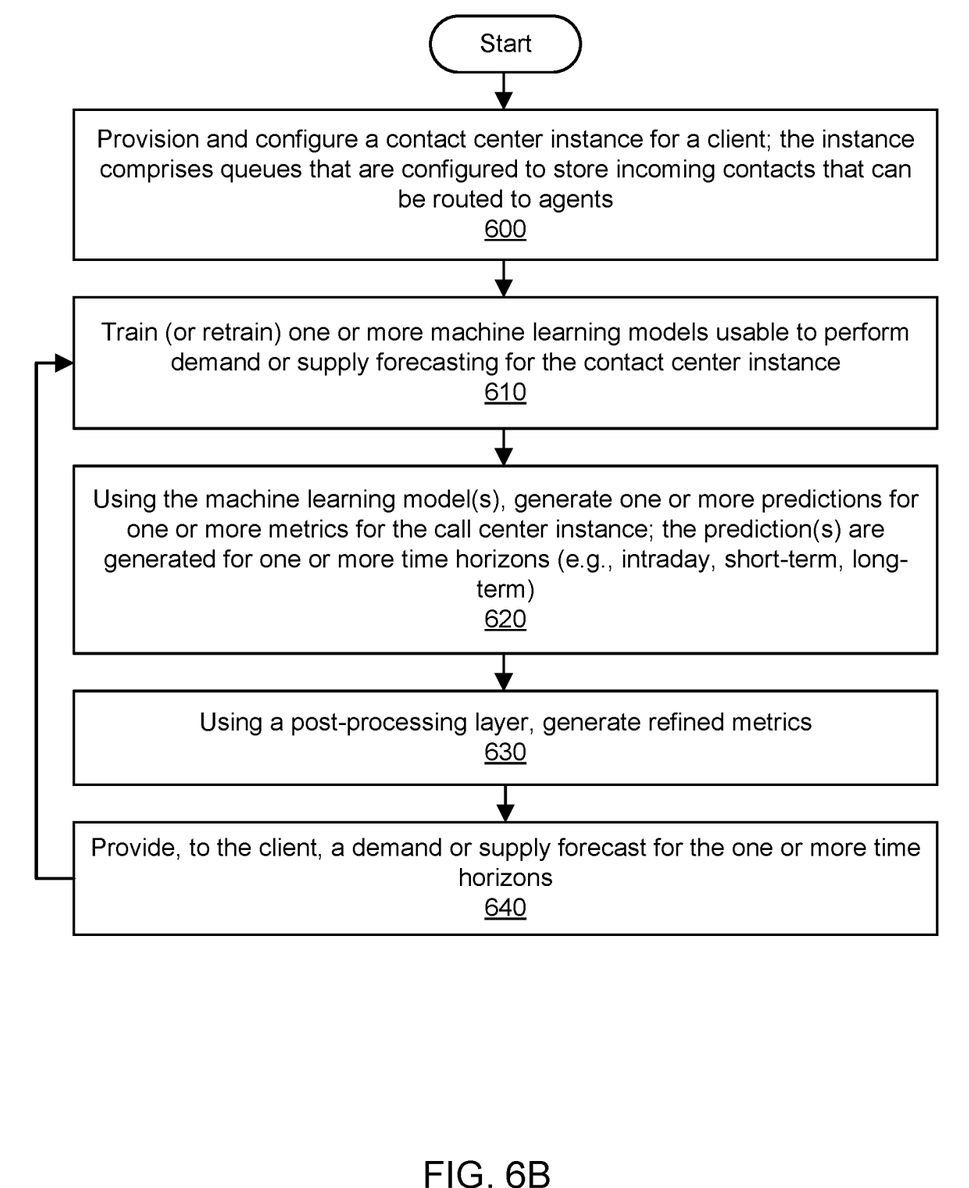

FIG. 6A and FIG. 6B are flowcharts illustrating methods for accurate usage forecasting for virtual contact centers, according to some embodiments. As shown in 600, a contact center instance may be provisioned and configured for (e.g., on behalf of) a client. The instance may comprise a plurality of queues. The queues may be configured to store incoming contacts such as phone calls by customers to one or more contact numbers for the client. The incoming contacts can be routed from the queues to human agents who can then assist customers with their customer service needs.

As shown in 610, one or more machine learning models may be trained. The model(s) may be usable to perform demand and supply forecasting for the contact center instance. In some embodiments, the model(s) may be trained at the level of a contact center instance or a cluster of queues. The machine learning model(s) may include temporal convolutional neural network models. In some embodiments, the machine learning model(s) may employ causal and dilated convolutional layers to extract high-level temporal patterns from multi-dimensional time series. In some embodiments, the machine learning model(s) may learn queue patterns from multiple queues such that the models are generalizable for new queue patterns or queues without available historical data. The model(s) may be retrained automatically and on a regular basis by using the most recent history (e.g., the most recent metrics) into the training loop.

As shown in 620, using the machine learning model(s), one or more predictions may be generated for one or more relevant metrics for the contact center instance. The predictions may be generated for one or more time horizons (e.g., intraday, short-term, long-term). Using model inference, the contact center management system may generate predicted contact center metrics at the queue level or queue-channel level using model(s) trained at a higher level of granularity (e.g., the instance level or queue cluster level). In some embodiments, the predicted metrics may include the contact volume for a queue or queue-channel, the average handling time for a queue or queue-channel, the customer satisfaction for a queue or queue-channel, the availability of agents, and so on. As shown in 630, a post-processing layer may generate refined predictions based (at least in part) on the predictions made in 620. For example, the refined predictions may be produced using noise reduction or smoothing, scaling, and other modifications applied to the original predictions.

As shown in 640, a demand or supply forecast based (at least in part) on the predictions may be provided to the client. Based (at least in part) on the predicted metrics for the particular client, the demand and supply forecasting may generate up-to-date forecasts for particular queues or queue-channels of the contact center instance. As shown in FIG. 6A, in some embodiments, predictions may be regularly updated for the various time horizons as shown in 620, 630, and 640. As shown in FIG. 6B, in some embodiments, the machine learning model(s) may be regularly retrained, and the retrained models may be used to make accurate predictions as shown in 610, 620, 630, and 640. Using the metrics, the demand and supply forecasting may make point forecasts and probabilistic forecasts (e.g., quantile forecasts). Demand and supply forecasts may be issued at different time horizons (e.g., intraday, short-term, long-term). The demand and supply forecasts may be provided to the client via appropriate channels, e.g., in a management console for the contact center instance. Using the forecasts, the client may properly staff their facilities with an appropriate number of agents to handle an anticipated set of incoming contacts without queues becoming too long or too many agents being idle. Thus the usage forecasting may permit the client to optimize their use of agents to strike a balance between customer satisfaction and cost.

Illustrative Computer System

In at least some embodiments, a computer system that implements a portion or all of one or more of the technologies described herein may include a computer system that includes or is configured to access one or more computer-readable media. FIG. 7 illustrates such a computing device 700 according to one embodiment. In the illustrated embodiment, computing device 700 includes one or more processors 710A-710N coupled to a system memory 720 via an input/output (I/O) interface 730. In one embodiment, computing device 700 further includes a network interface 740 coupled to I/O interface 730.

In various embodiments, computing device 700 may be a uniprocessor system including one processor or a multiprocessor system including several processors 710A-710N (e.g., two, four, eight, or another suitable number). In one embodiment, processors 710A-710N may include any suitable processors capable of executing instructions. For example, in various embodiments, processors 710A-710N may be processors implementing any of a variety of instruction set architectures (ISAs), such as the x86, PowerPC, SPARC, or MIPS ISAs, or any other suitable ISA. In one embodiment, in multiprocessor systems, each of processors 710A-710N may commonly, but not necessarily, implement the same ISA.

In one embodiment, system memory 720 may be configured to store program instructions and data accessible by processor(s) 710A-710N. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720, e.g., as code (i.e., program instructions) 725 and data 726. In the illustrated embodiment, program code implementing aspects of the contact center management system 100 may be stored in system memory 720.

In one embodiment, I/O interface 730 may be configured to coordinate I/O traffic between processors 710A-710N, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processors 710A-710N). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In some embodiments, some or all of the functionality of I/O interface 730, such as an interface to system memory 720, may be incorporated directly into processors 710A-710N.

In one embodiment, network interface 740 may be configured to allow data to be exchanged between computing device 700 and other devices 760 attached to a network or networks 750. In various embodiments, network interface 740 may support communication via any suitable wired or wireless general data networks, such as types of Ethernet network, for example. Additionally, in some embodiments, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 700 via I/O interface 730. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 700 as system memory 720 or another type of memory. In one embodiment, a computer-readable medium may include transmission media or signals such as electrical, electromagnetic, or digital signals, conveyed via a communication medium such as a network and/or a wireless link, such as may be implemented via network interface 740. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    one or more processors and one or more memories to store computer-executable instructions that, when executed, cause the one or more processors to implement a contact center management system to:
        provision a contact center instance associated with a client, wherein the contact center instance comprises a plurality of queues configured to store incoming contacts, and wherein at least a portion of the incoming contacts are routed to a plurality of agents;
        for one or more machine learning models for which there is insufficient training data to train at an individual-queue granularity level,
            train, at a granularity level comprising two or more queues having similar characteristics, the one or more machine learning models to predict metrics for one or more of the contact center instance queues, the two or more queues based on first metrics obtained prior to said train;
        generate, using one or more of the trained machine learning models for the contact center instance that was trained at the granularity level comprising two or more queues having similar characteristics, a plurality of first predictions for a plurality of metrics for the contact center instance for a plurality of time horizons, wherein the metrics comprise a contact volume of the incoming contacts and an average handling time of the incoming contacts by the plurality of agents, and wherein at least a portion of the plurality of first predictions for the plurality of metrics are generated at an individual-queue granularity level for individual ones of the plurality of queues of the contact center instance;
        wherein said generate the plurality of first predictions using one or more of the trained machine learning models trained at the granularity level comprising two or more queues generates the first predictions despite insufficient training data for training the one or more machine learning models at the individual-queue granularity level;
        generate, using a post-processing layer that reduces noise in the plurality of first predictions, a plurality of refined predictions for the plurality of metrics;
        transmit, over a network to a device of the client for display by the device, one or more forecasts for individual ones of the plurality of queues based at least in part on the plurality of refined predictions for the plurality of metrics; or
        transmit the plurality of refined predictions over a network to one or more additional systems; and
        retrain, based on second metrics obtained subsequent to said train the one or more machine learning models, the one or more trained machine learning models to predict the plurality of metrics for the one or more of the contact center queues; and
        use the retrained one or more machine learning models to generate one or more second predictions for one or more of the plurality of metrics.

2. The system as recited in claim 1, wherein the one or more machine learning models comprise one or more queue-agnostic models, wherein the one or more queue-agnostic models are trained without historical data for a particular one of the queues, and wherein at least a portion of the first predictions for the metrics are generated for the particular one of the queues using the one or more queue-agnostic models without specifying an identifier for the particular one of the queues.

3. The system as recited in claim 1, wherein the one or more memories store additional computer-executable instructions that, when executed, cause the one or more processors to:
    receive, from the client, business driver data predictive of the plurality of metrics, wherein the one or more machine learning models are trained using the business driver data.

4. The system as recited in claim 3, wherein the one or more memories store additional computer-executable instructions that, when executed, cause the one or more processors to:
  perform validation or formatting of the business driver data, wherein the one or more machine learning models are trained using the business driver data after the validation or formatting.

5. A method, comprising:
  performing, by one more computing devices of a contact center management system:
    configuring a contact center instance associated with a client, wherein the contact center instance comprises a plurality of queues configured to store contacts, and wherein at least a portion of the contacts are routed to a plurality of agents;
    for one or more machine learning models associated with the contact center instance and for which there is insufficient training data to train at an individual-queue granularity level,
      training, at a granularity level comprising two or more queues having similar characteristics, the one or more machine learning models associated with the contact center instance to predict metrics for one or more of the contact center instance queues, the two or more queues based on first metrics obtained prior to said training;
    determining, using one or more of the trained machine learning models associated with the contact center instance trained at the granularity level comprising two or more queues having similar characteristics, a plurality of first predictions for a plurality of metrics for the contact center instance for a plurality of time horizons, wherein the metrics comprise a contact volume of the contacts, and wherein at least a portion of the plurality of first predictions for the plurality of metrics are generated at an individual-queue granularity level for individual ones of the plurality of queues of the contact center instance;
    wherein said determining the plurality of first predictions using one or more of the trained machine learning models trained at the granularity level comprising two or more queues determines the first predictions despite insufficient training data for training the one or more machine learning models at the individual-queue granularity level;
    transmitting one or more forecasts based on one or more of the first predictions over a network to a device of the client for display by the device, or, sending the plurality of first predictions from the contact center management system over a network to one or more additional systems;
    retraining, based on second metrics obtained subsequent to said training the one or more machine learning models, the one or more trained machine learning models to predict the plurality of metrics for the one or more of the contact center instance queues; and
    generating, using the retrained one or more machine learning models, one or more second predictions for one or more of the plurality of metrics.

6. The method as recited in claim 5, wherein the one or more machine learning models are trained without historical data for a particular one of the plurality of queues, and wherein at least a portion of the plurality of first predictions for the plurality of metrics are determined for the particular one of the plurality of queues using the one or more machine learning models.

7. The method as recited in claim 5, further comprising:
  receiving, from the client, business driver data correlated with the plurality of metrics, wherein the machine learning models are trained using the business driver data.

8. The method as recited in claim 7, further comprising:
  performing validation of the business driver data, wherein the one or more machine learning models are trained using the business driver data after the validation.

9. The method as recited in claim 7, further comprising:
  rejecting at least a portion of the business driver data based at least in part on a lower accuracy of the one or more machine learning models after training using the portion of the business driver data.

10. The method as recited in claim 5, further comprising:
  determining, using a post-processing layer that reduces noise in the plurality of first predictions, a plurality of refined predictions for the plurality of metrics.

11. The method as recited in claim 5, wherein the one or more machine learning models are trained using historical data for at least some of the plurality of queues of the contact center instance.

12. The method as recited in claim 5, wherein said sending the plurality of first predictions from the contact center management system over a network to one or more additional systems further comprises:
  sending the plurality of first predictions from the contact center management system to one or more additional systems that perform one or more additional tasks using the plurality of first predictions.

13. One or more non-transitory computer-readable storage media storing program instructions that, when executed on or across one or more processors, implement a contact center management system to perform:
  configuring a contact center instance associated with a client, wherein the contact center instance comprises a plurality of queues configured to store incoming contacts, and wherein at least a portion of the incoming contacts are routed to a plurality of agents;
  for one or more machine learning models associated with the contact center instance and for which there is insufficient training data to train at an individual-queue granularity level,
    training, at a granularity level comprising two or more queues having similar characteristics, the one or more machine learning models associated with the contact center instance to predict metrics for one or more of the contact center instance queues, the two or more queues based on first metrics obtained prior to said training;
  determining, using one or more of the trained machine learning models for the contact center instance trained at the granularity level comprising two or more queues having similar characteristics, a plurality of first predictions for a plurality of metrics for the contact center instance for a plurality of time horizons, wherein the metrics comprise an average handling time of the incoming contacts by the plurality of agents, and wherein at least a portion of the plurality of first predictions for the plurality of metrics are generated at an individual-queue granularity level for individual ones of the plurality of queues of the contact center instance;

wherein said determining the plurality of first predictions using one or more of the trained machine learning models trained at the granularity level comprising two or more queues generates the plurality of first predictions despite insufficient training data for training the one or more machine learning models at the individual-queue granularity level;

transmitting, by the contact center management system over a network to the client, one or more forecasts for individual ones of the plurality of queues based at least in part on the plurality of first predictions for the plurality of metrics for the contact center instance; or transmitting the plurality of first predictions over a network to one or more additional systems; and retraining, based on second metrics obtained subsequent to said train the one or more machine learning models, the one or more trained machine learning models to predict the plurality of metrics for the one or more of the contact center queues; and use the retrained one or more machine learning models to generate one or more second predictions for one or more of the plurality of metrics.

14. The one or more non-transitory computer-readable storage media as recited in claim 13, wherein the one or more machine learning models comprise one or more queue-agnostic models, wherein the one or more queue-agnostic models are trained without historical data for a particular one of the queues, and wherein at least a portion of the first predictions for the metrics are determined for the particular one of the queues using the one or more queue-agnostic models without specifying an identifier for the particular one of the queues.

15. The one or more non-transitory computer-readable storage media as recited in claim 13, further comprising additional program instructions that, when executed on or across the one or more processors, perform:

receiving, from the client, business driver data predictive of the plurality of metrics, wherein the one or more machine learning models are trained using the business driver data.

16. The one or more non-transitory computer-readable storage media as recited in claim 15, further comprising additional program instructions that, when executed on or across the one or more processors, perform:

performing formatting of the business driver data to meet a schema, wherein the one or more machine learning models are trained using the business driver data after the formatting.

17. The one or more non-transitory computer-readable storage media as recited in claim 13, wherein, for an individual one of the metrics and an individual one of the time horizons, one or more of the machine learning models are trained using historical data that does not exceed a duration of the individual one of the time horizons.

18. The one or more non-transitory computer-readable storage media as recited in claim 13, further comprising additional program instructions that, when executed on or across the one or more processors, perform:

determining, using a post-processing layer that performs smoothing in the plurality of first predictions, a plurality of refined predictions for the plurality of metrics.

19. The one or more non-transitory computer-readable storage media as recited in claim 13, wherein the one or more machine learning models comprise a temporal convolutional neural network model.

20. The one or more non-transitory computer-readable storage media as recited in claim 13, wherein determining the plurality of first predictions for the plurality of metrics further comprises:

extracting features from continuous time series data using dilated causal convolution, wherein the features are extracted for the plurality of time horizons having a plurality of durations.

\* \* \* \* \*